US006660353B2

(12) United States Patent
Siedl

(10) Patent No.: US 6,660,353 B2
(45) Date of Patent: Dec. 9, 2003

(54) LABEL FOR LABELLING OF PREFERABLY CYLINDRICAL CONTAINERS

(75) Inventor: Peter Siedl, Munich (DE)

(73) Assignee: Schreiner GmbH & Co. KG, Oberschleibheim (DE)

( * ) Notice: Subject to any disclaimer, the term of this patent is extended or adjusted under 35 U.S.C. 154(b) by 137 days.

(21) Appl. No.: 09/901,565

(22) Filed: Jul. 11, 2001

(65) Prior Publication Data

US 2003/0012913 A1 Jan. 16, 2003

(51) Int. Cl.[7] .................................................. B32B 7/12

(52) U.S. Cl. .......................... 428/40.1; 40/306; 40/310; 40/630; 283/81; 283/101; 283/105; 428/41.7; 428/41.8; 428/42.1; 428/42.2; 428/42.3; 428/43

(58) Field of Search ............................... 428/40.1, 41.7, 428/41.8, 42.1, 42.2, 42.3, 43; 283/81, 101, 105; 40/310, 306, 630

(56) References Cited

U.S. PATENT DOCUMENTS 5,829,789 A * 11/1998 Treleaven .................... 283/81
6,035,568 A * 3/2000 Grosskopf ................... 40/630
6,193,279 B1 2/2001 Seidl

FOREIGN PATENT DOCUMENTS

EP 0463 193 1/1992
WO WO 99/21156 4/1999

OTHER PUBLICATIONS

English Translation of EP 0463–193.

* cited by examiner

*Primary Examiner*—Nasser Ahmad
(74) *Attorney, Agent, or Firm*—Nixon Peabody LLP; Donald R. Studebaker

(57) ABSTRACT

A label for labelling containers, preferably small cylindrical medical containers. The label includes a base part having a first adhesive layer on its bottom side, and an overlapping part which at least partially covers the base part when the label is wound around the container. There are removable tags provided in the base part and in the overlapping part of the container. In this way optimum use of the jacket surface of a labeled container can be achieved.

30 Claims, 2 Drawing Sheets

LABEL FOR LABELLING OF PREFERABLY CYLINDRICAL CONTAINERS

BACKGROUND OF THE INVENTION

1. Field of the Invention

The present invention relates to the field of labels for labeling containers, preferably cylindrical containers and to containers which are provided with such labels. In addition, the present invention relates to such labels having at least one removable tag and an attachment means for detachably attaching the removable tag. In particular, the present invention is directed to such labels with a base part having a first adhesive layer on its bottom side, and an overlapping part which at least partially covers the base part when the label is placed on the container.

2. Discussion of the Prior Art

Labels of this general type are known in the art, for example, as shown in European patent EP 0 483 193 B1. Such labels are used to label containers which are used predominantly to contain medicine. The self-adhesive removable tag or tags contain information regarding the contents of the container. The self-adhesive removable tag or tags can be removed and be pasted onto a record documentation so that information about the contents of the container is transferred into the record without the danger of confusion or error such as misidentification of the content.

In medical applications, it has become increasingly necessary to make available extensive information regarding the contents of the container directly on the label of small containers. Removable tags, of which there are generally at least two tags provided, usually simply provide an expiration date and a batch number. Despite the fact that comparatively small amount of information is provided on the tag, the size of the individual tag must still be minimized to enable convenient handling of the tag (i.e. to allow easy separation of the self-adhesive tag and pasting onto a record document). However, since these tags are generally machine printed by the drug manufacturer shortly before placing the label on the container, the tags must have a size which will allow a certain amount of fault tolerance in the placement of the print (i.e. allow minor misplacement of the print). In addition drug manufacturers have recently increasingly demanded labels which have not only two, but three or more removable tags. All of these requirements results in most of the jacket surface of small containers being easily covered by the tags so that hardly any space is available to provide other medically important information.

U.S. Pat. No. 6,193,279 B1 discloses a label for labeling containers, preferably cylindrical containers. The label has at least one removable tag and an attachment means for detachably attaching the removable tag. In particular, the label includes a base part having a first adhesive layer on its bottom side, and an overlapping part which at least partially covers the base part when the label is placed on the container. In this way optimum use of the jacket surface of a labeled container can be achieved. If the diameter of the container to be labeled is very small it is difficult to provide three or more removable tags in a label of that kind.

SUMMARY OF THE INVENTION

The primary object of the present invention is to devise a label of the initially mentioned type in which the label covering mare than the entire jacket surface of the container can be used for providing information.

This primary object is achieved by providing a label having at least one removable tag being provided on the base part and at least one further removable tag provided on the overlapping part.

In fact, the present invention surprisingly results in the possibility of attaching information in any configuration on the overlapping part which can cover the entire jacket surface of the container as desired. The top side of the overlapping part need not be preheated in any way so that the information there can be attached in full, or in part, by an end consumer after the completion of the label, for example, with an inkjet printer. Likewise, labels in accordance with the present invention are far superior compared to labels of the prior art with respect to their size and number since more than the entire jacket surface (if desired) is available for tags which are attached in the base part and the overlapping part as well thus offering almost unlimited possibilities of utility.

When the removable tags which are contained in the base part are completely covered by the overlapping part, large information surfaces and large surfaces can be provided for the tags relative to the jacket surface of the container. Thus, in accordance with one advantageous embodiment of the present invention, there is provided a fastening means for detachably fastening the overlapping part. The overlapping part which may be provided with the permanent information and with at least one removable tag, can be temporarily lifted using the fastening means and can be unwound from the container such that the removable tags formed in the base part become accessible and can be removed for purposes of further use. After removing the tag or the tags, the overlapping part can again be attached around the container so that it assumes its original position in which it completely covers the base part and its tags.

According to one advantageous embodiment of the present invention, the attachment means for detachably attaching the removable tag or tags comprises a bottom smooth layer which is attached to the bottom side of the base part and the overlapping part, respectively and which adjoins the removable tag. When the label is applied to the container, the aforementioned bottom smooth layer lies between the tags and the surface of the container to a certain extent and prevents the self-adhesive tags from being securely joined to the surface of the container.

According to one advantageous embodiment of the present invention, the bottom smooth layer is located on a material portion. Preferably, the material portion overlaps the tags in the lengthwise direction of the label and also extends slightly beyond the side of the tags opposite the edge in common with an outside edge of the label. The bottom smooth layer conversely corresponds in its surface area roughly to that of the tag or the tags. In this way, the material portion with the bottom smooth layer adheres securely to the first adhesive layer on the bottom side of the label since the bottom smooth layer has a smaller surface area than the material portion.

The bottom smooth layer can be printed onto the material portion, and if desired, a point grid or the like can be used to control the adhesion force between the tags and the bottom smooth layer or the material portion.

Preferably, the material portion, as far as the tags provided in the base part are concerned, may be provided with a securing adhesive layer on its side facing away from the tags which enables reliable securing of the material portion to the container.

It has been found that according to one advantageous embodiment of the present invention, the tags can be separated from the base part and the overlapping part respectively by providing continuous scoring or die cut and yet, the tags can nevertheless be held in position relatively reliably even during application of the label.

Preferably, the tags my be provided with a non-adhesive edge pieces which may be used as a removal aid and which also prevents the user from coming into contact with the adhesive of the tag when the tag is being removed and when it is being pasted into a record document.

According to one advantageous embodiment of the present invention, the base part of the label has a widened area in the area of the tags. As a result of this widened area, the base part is not completely covered by the overlapping part, but instead, a narrow edge strip of the tags is made visible. The tags of the base part are thus available to the user in an obviously visible way so that it is clear that the user need simply temporarily remove the overlapping part to gain access to the tags provided at the base part.

Preferably the base part may be of a length which corresponds to the periphery of the container to be labeled. Since the base part has a first adhesive layer on its bottom side, the entire base part is securely joined to the container when the label is attached to the container.

Preferably, the first adhesive layer applied to the base part extends at least partially towards the overlapping part so that the overlapping part is also relatively reliably attached to the base part.

At least in the end area of the overlapping part opposite from the base part, there is provided a fastening adhesive layer which ensures reliable fastening of the free end of the overlapping part. Preferably, the fastening adhesive layer is recessed at one corner such that a non-adhesive edge corner is formed as a removal aid.

According to another advantageous embodiment of the present invention, the center area of the overlapping part is made non-adhesive so that lifting of the overlapping part is facilitated. In particular, this prevents the possibility of individual tags being torn out of the base part when the overlapping part is lifted. Likewise, the tags are prevented from being fouled with adhesive.

The fastening means for detachably fastening of the overlapping part according to one advantageous embodiment of the invention comprises a fastening adhesive layer provided on the free end of the overlapping part.

In one alternative embodiment, the fastening means for detachably fastening the overlapping part can also comprise an adhesive-repelling top smooth layer which is located an the top side of the label such that after applying the label to the container, the fastening adhesive layer can adhere to the smooth layer and can be easily removed from the top smooth layer.

Preferably, the overlapping part which may be provided with the basic information as already explained, has a length which roughly corresponds to the periphery of the container to be labeled. If the overlapping part is provided having a greater length than the periphery of the container, the overlapping part may be wound repeatedly on the container thus, overlapping with itself.

On the bottom side of the overlapping part, an information sheet can be located which can be printed on both sides. Of course there can also be several information sheets in the manner of a booklet.

According to another alternative embodiment, the tag or the tags may have a tag adhesive layer and be located on the top side of the base part and/or on the top side of the overlapping part.

Here, it is advantageous if on the top side of the base part and the overlapping part, respectively, there is provided an adhesive-repelling smooth layer on which at least one tag temporarily adheres.

The invention relates to a label which has the following features: a base part which is provided with a first adhesive layer with which it adheres to the entire periphery of the container, a overlapping part by which the base part is at least partially covered, and at least one removable tag.

In order to allow the use of the entire jacket surface of the container in any way for product information and instructions for use, the present invention provides at least one removable tag provided in the base part and one further removable tag in the overlapping part and attachment means between the tags and the container for detachably attaching the removable tag.

According to one advantageous embodiment, the present invention may be provided with a base part having a length which corresponds to the periphery of the container to be labeled. According to yet another embodiment, the present invention may be provided with an overlapping part having a length which corresponds roughly to the perpihery of the container to be labeled.

To produce the label, films (transparent or opaque), papers or composite materials can be used.

Since the label in accordance with the present invention may have adhesive and non-adhesive areas, the label may either be selectively coated with an adhesive or the length of material may be coated over its entire surface with an adhesive and certain surface areas may then be made non-adhesive by overprinting or covering these areas with a substance which neutralizes the action of the adhesive (sometimes called "adhesive deadener").

The label can be printed in almost any printing process and the surface of the label may be used as the print medium. However, if a transparent length of material is to be used, the label can also be advantageously printed on the bottom side, i.e. on the side which is afterwards coated with adhesive. Scripts in this case must be applied mirror-reversed. Generally, the scripts are then overprinted with a background printing ink. This version of imprinting has the advantage in that the applied print is protected by the label film itself against wearing off, since it is located between the film and the container:

Embodiments of the present invention are detailed below wherein the embodiments are shown schematically in the various figures. It should be noted that the drawings in the figures are not to scale, especially with regard to layer thicknesses which are shown greatly increased compared to the other dimensions for the sake of clarity.

DETAILED DESCRIPTION OF THE INVENTION

Figure 1:
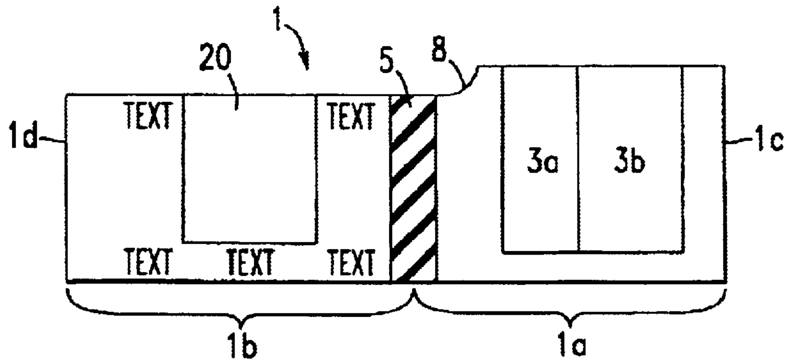
FIG. 1 shows an overhead view of a label in accordance with one embodiment of the present invention.

FIG. 1 shows an overhead view of a label 1 in accordance with one embodiment of the present invention with a base film also labeled in its entirety with reference number 1 and its subparts designated with suffix lettering. The label 1 is roughly rectangular in its general outline shape and has a base part 1*a* and an overlapping part 1*b* which adjoins the base part 1*a* in one piece. The base part 1*a* has a length which corresponds to the periphery of the container to be labeled (not shown). It should also be noted that the label may be produced using films (transparent or opaque), papers or composite materials among others.

In the base part 1*a* of the illustrated embodiment there are a total of four rectangular scored lines which form the removable or detachable tags 3*a* and 3*b*. In the overlapping part 1*b* there are three rectangular scored lines forming one further removable tag 20. The tags 3*a*, 3*b* and 20 are arranged such that they have one edge in common with a long outside edge of the base part 1*a* and the overlapping part 1*b*, respectively, to allow a person to grasp a tag easily. In the area of the tags 3*a* and 3*b* and to some extent beyond the area of the tags, the base part 1*a* has a widened area 3 which is explained further below. On the top side of the label 1 in the area of the base part 1*a* in the vicinity of the overlapping part 1*b*, the label 1 is provided with an adhesive-repelling top smooth layer 5. The overlapping part 1*b* of the label 1 adjoining the base part 1*a* likewise has a length which corresponds roughly to the peripheral dimension of the container. The top side of the overlapping part 1*b* is provided with an imprint which is symbolized in the drawing by repetition of the word "text". Of course the imprint can have any shape and color. In particular, there are no limitations with respect to use of typical printing processes since the top side of the label 1 shown in FIG. 1, need not be pretreated at all (except the top smooth layer 5) to implement the label of the present embodiment. The punched-out removable tags 3*a*, 3*b* and 20 also include printed text (not shown). Such printed text are conventionally provided shortly before the application of the label with a current imprint, for example, an expiration date. In addition there may also be imprints which are conventionally constant such as the name of the product contained in the container, for example.

Figure 2:
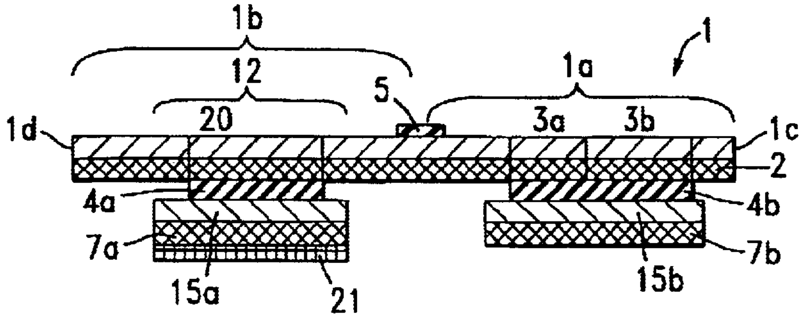
FIG. 2 shows a longitudinal cross sectional view of the label of FIG. 1.

FIG. 2 shows a longitudinal cross sectional view of the label of FIG. 1. This figure clearly indicates the base part 1*a* and overlapping part 1*b* which can be easily recognized. The figure also clearly indicates the tags 3*a*, 3*b* and 20 punched out of the film of the base part 1*a*, and the overlapping part 1*b* and the adhesive-repelling top smooth layer 5 which is mentioned above in connection with FIG. 1. In addition, as also shown in FIG. 2 the base part 1*a* and the overlapping part 1*b* are at their bottom sides coated with a first adhesive layer 2. The center area 12 (shown also in FIG. 3) of the overlapping part 1*b* is non-adhesive (as explained later) so that lifting of the overlapping part 1*b* is facilitated. In particular, this prevents the possibility of individual tags 3*a*, 3*b* being torn out of the base part 1*a* when the overlapping part 1*b* is lifted. Likewise, the tags 3*a* and 3*b* are prevented from being fouled with adhesive.

In the area of the removable tags 3*a*, 3*b* and 20 extending somewhat beyond these areas the first adhesive layer 2 is covered with pieces of film or material portions 15*a* and 15*b* each of which has a bottom smooth layer 4*a* and 4*b* respectively on its side facing the base film 1. On the opposite side of the material portions 15*a* and 15*b* (side facing away from the base film 1), the materials portion 15*a* and 15*b* are provided with a securing adhesive layer 7*a* and 7*b* which secures the material portion 15*b* to the container, while the adhesive layer 7*a* is covered by an adhesive deadener 21 as explained later. Each material portion 15*a* and 15*b*, overlaps the tags in the lengthwise direction of the label 1 and also extends slightly beyond the side of the tags opposite the edge in common with an outside edge of the base part 1*a* and the overlapping part 1*b*. In other words, in this illustrated embodiment, each material portion 15*a* and 15*b* has a larger surface area than the surface area of the tags 3*a*, 3*b* and 20. The material portion 15*a* and 15*b* adhere securely to the first adhesive layer 2 since the bottom smooth layers 4*a* and 4*b* have a smaller surface area than the material portions 15*a* and 15*b* as clearly shown in FIG. 2. It should be clarified that the distance between the material portions 15*a* and 15*b* and the first adhesive layer 2 as depicted in FIG. 2 is caused by the fact that each layer is illustrated with exaggerated thickness dimensions for clarification purposes. In actuality, this distance depicted is really not present since the bottom smooth layer 4 has only a thickness of a few microns. The securing adhesive layer 7*a* of material portion 15*a* is covered by a layer of an adhesive deadener 21, i.e. a material which neutralizes the action of the adhesive. In this way the non-adhesive center area 12, i.e. an area free of active adhesive, in the overlapping part 1*b* is provided.

Figure 3:
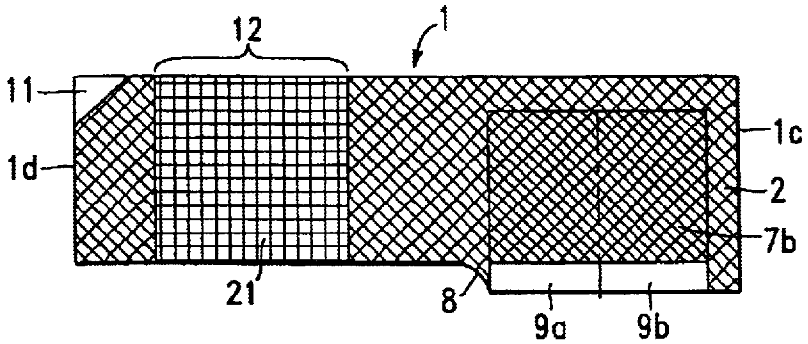
FIG. 3 shows the reverse side of the label of FIG. 1 as viewed from underneath the label.

FIG. 3 shows the reverse side of the label of FIG. 1 as viewed from underneath the label, i. e. viewed from the side coated with the adhesive. The first adhesive layer 2 mentioned above in conjunction with FIG. 2 can be clearly seen in FIG. 3. The adhesive layer 2 includes a recessed portion in an edge-side corner area so that a non-adhesive corner piece 11 is formed for use as a removal aid. Similar recesses are provided in the edge areas of the respective tags 3*a* and 3*b* such that the tags may be removed using the nonadhesive edge pieces 9*a* and 9*b*. FIG. 3 also clearly shows the securing adhesive layer 7*b* which is applied to the material portion 15*b* and the layer of adhesive deadener 21 provided in the center region 12 of the overlapping part 1*b*.

As can be clearly seen in the described embodiment, the size of the material portion 15*b* is selected such that it does not cover the non-adhesive edge pieces 9*a* and 9*b* of the tags 3*a* and 3*b*, thereby further improving the detachability of the pieces of the base film 1. In the same way as tags 3*a* and 3*b* of the base part 1*a* are covered by material portion 15*b* and its smooth layer 4*b* the tag 20 provided in the overlapping part 1*b* is covered at the bottom side by material portion 15*a* and its smooth layer 4*a*. Since the adhesive layer 7*a* of the material portion 15*a* is covered by an adhesive deadener 21 the material portion 15*a* will not be secured to the container. The material portion 15*a* will instead be attached firmly to the bottom side of the overlapping part 1*b* due to the fact its surface facing the first adhesive layer is not entirely covered by smooth layer 4*a*. Consequently the material portion 15*a* remains with the overlapping part 1*b* when this is lifted off from the container. The material portion 15*a* serves in this way to back up the mechanical strength of the overlapping part 1*b* when this is weakened by removing the tag 20 of overlapping part 1*b*.

In principle adhesive layer 7*a* of material portion 15*a* could be omitted thus making the layer of adhesive deadener 21 disposable. However, material portions 15*a* and 15*b* including their adhesive layers 7*a* and 7*b* are manufactured from one continuous length which facilitates the production process considerably which will be explained in detail later.

The label shown in FIGS. 1 to 3 is processed as follows:

The labels are generally located on a carrier belt (not shown) which has an adhesive-repelling smooth layer. Thus, the direction in which the carrier belt runs is parallel to the longitudinal direction of the label. The labels are located on the carrier belt such that the the respective base part 1*a* lies forward in the running direction. The carrier belt is pulled using a known technique over one detachment edge (not shown) which causes separation between the label and the carrier belt. The label which runs over the detachment edge with the free end edge 1*c* of the base part 1*a* comes into contact with a rotating cylindrical container (not shown), whereon the first adhesive layer 2 is joined to the jacket surfaces of the container.

Since the base part 1*a* has the length of the periphery of the container, the base part 1*a*, including the material portion 15*b* with the bottom smooth layer 4*b* and the securing adhesive layer 7*b*, is placed around the outer jacket surface of the container, and a strong connection is established between these two parts. As the container rotates a second time, the overlapping part 1*b* is wound over the base part 1*a* until the free end of the overlapping part 1*b* reaches the base part 1*a*, or more accurately, the fastening adhesive layer reaches the adhesive-repelling top smooth layer 5 of the base part 1*a*. The overlapping part 1*b* is fastened by the first adhesive layer 2 on its free end edge 1*d* and on its other end.

Figure 4:
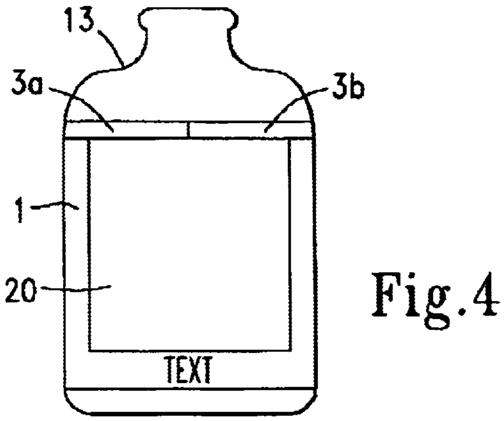
FIG. 4 shows a container with the label of FIG. 1 adhered thereto.

A container 13 provided with the label 1 is clearly illustrated in FIG. 4. As can be seen, the entire cylindrical jacket surface of the container 13 is covered by the overlapping part 1*b* which bears the information about the contents of the container. As a result of the widened area 8 of the base part 1*a* in the area of the tags 3*a* and 3*b*, small portions of the tags 3*a* and 3*b* on the upper edge of the label which identify the location of the tags 3*a* and 3*b* can be easily recognized by the user once the label 1 is applied to the container 13.

To reach the tags 3*a* and 3*b*, the user, with the aid of the non-adhesive corner piece 11, detaches the free end of the overlapping part 1*b* thereby exposing the tags 3*a* and 3*b*. Then, the user can grasp and remove one or more tags by the non-adhesive edge pieces 9*a* and 9*b* and fasten the removed tags elsewhere for documentation purpose. These non-adhesive edge pieces 9*a* and 9*b* prevent the user from coming into contact with the adhesive of the tag when the tag is being removed and when it is being pasted into a record document. The tags 3*a* and 3*b* can be easily detached since they are adhered to the adhesive repelling bottom smooth layer 4*b*. If desired, a point grid or the like, can be used to control the adhesion force between the tags and the bottom smooth layer 4*b* or the material portion. 15. After removing the desired number of tags the user wraps the overlapping part 1*b* around the container 13 so that the previously illustrated state shown in FIG. 4 is restored. In any case, it can now be recognized which tags have already been removed since, as explained, the tags are not completely covered by the overlapping part 1*b*. If the overlapping part 1*b* is provided having a greater length than the periphery of the container, the overlapping part 1*b* may be wound repeatedly on the container thus, overlapping with itself.

The further removable tag 20, provided in the overlapping part 1*b* may be simply detached by grasping it and tearing it out of the overlapping part 1*b* without the need of lifting the overlapping part 1*b* off from the container. If the information on the removable tags 3*a*, 3*b* and 20 is the same as that on the material portions 15*a* and 15*b* underlying these tags, the information on the labeled container 13 remains unchanged even after removal of the tags.

Figure 5:
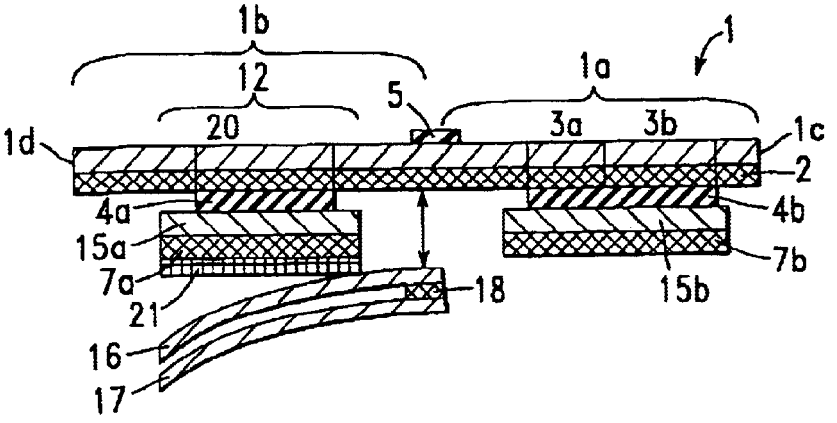
FIG. 5 shows a longitudinal cross sectional view of a label in accordance with another embodiment of the present invention.

An alternative embodiment of the present invention is illustrated in FIG. 5. The label shown in FIG. 5 differs from the label shown in FIG. 2 only in that on the bottom side of the overlapping part 1*b*, there are provided two additional information sheets 16 and 17 which are fastened to the bottom side of the overlapping part 1*b*. The information sheet 16 is fastened on the edge of the first adhesive layer 2 of the base part 1*a*. The distance between the information sheet 16 and the first adhesive layer 2, which appears in the drawing due to the exaggerated thickness of the various layers, does not exist in reality. To fasten the information sheet 17, a small additional fourth adhesive layer 18 is used. The information sheets 16, 17 have a length such that they are encompassed within the non-adhesive center area 12 of the overlapping part 1*b* and are wrapped with it around the container to be labeled. Otherwise, the structure of the label shown in FIG. 5 is identical to that shown in FIG. 2, so that reference can be made to the description of FIG. 2 in this regard.

Figure 6:
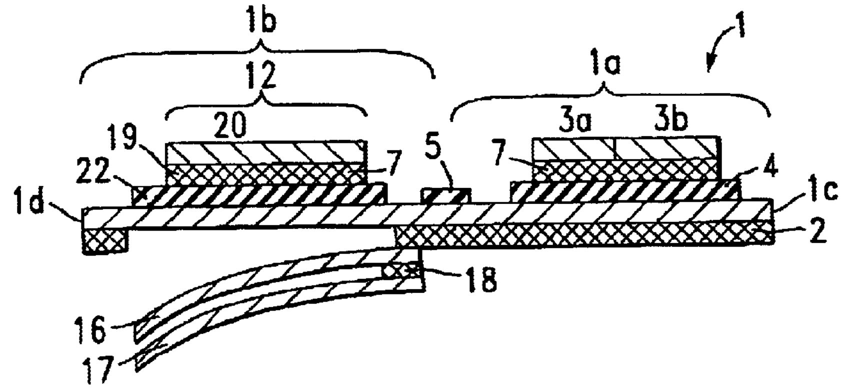
FIG. 6 shows a longitudinal cross sectional view of a label in accordance with yet another embodiment of the present invention.

Yet another alternative embodiment of the present invention is illustrated in FIG. 6. The label shown in FIG. 6 differs from the label shown in FIG. 2 in that the tag 20 as well as tags 3*a* and 3*b* are provided as separate parts on the top side of the overlapping part 1*b* and the base part, respectively. In this embodiment, the top side of the overlapping part is provided with an adhesive-repelling top smooth layer 22. The tag 20 is provided with a tag adhesive layer 19 which removably adheres the tag 20 to the top smooth layer 22. Further the label shown in FIG. 6 is provided with a booklet comprising two information sheets 16 and 17 which are adhered to the first adhesive layer 2. The central area 12 of the overlapping part 1*b* is non-adhesive so that information sheet 16 adheres only at the spine of the booklet. Otherwise, the structure and handling of the layer shown in FIG. 6 are identical to that shown in FIG. 2 so that the reference can be made to the description of FIG. 2 in this regard.

Figure 7:
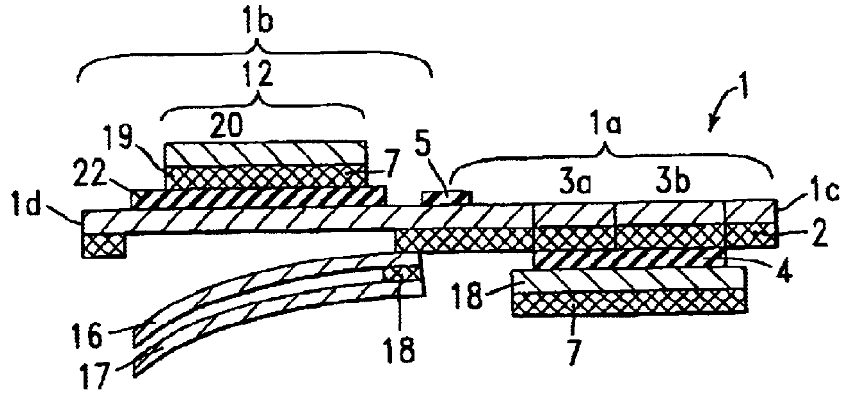
FIG. 7 shows a longitudinal cross sectional view of a label in accordance with yet another embodiment of the present invention.

FIG. 7 shows a further embodiment in which the removable tag 20 of the overlapping part 1*b* is attached at the top side of the overlapping part 1*b*, as already described with regard to the embodiment of FIG. 6, whereas the tags 3*a* and 3*b* of the base part 1*a* are provided by punch lines in the base part 1*a* as already shown and described with regard to the embodiment of FIG. 2. The embodiment of FIG. 7 demonstrates that various combinations of the several embodiments can be made.

The label of FIG. 2 may be produced as follows:

A continuous length of material of a transparent film of clear polypropylene (not shown) is provided with an imprint (not shown) intended for the base part 1*a*, the overlapping part 1*b* and especially the tags 3*a*, 3*b* and 20 of the base part 1*a* and the overlapping part 1*b*. The imprint is a mirror image of the imprint to be left on the label when viewed from the top after completion of the label. A background contrast ink is printed in whole, or in part, over this imprint. In certain embodiments of the present invention, it may be advantageous to leave exposed at least a small "window" In the base part 1*a* and a corresponding "window" in the overlapping part 1*b* in order to allow visual inspection into the container 13, for example to check the fill level of the container 13.

The printed film is thereupon printed on the same side with an adhesive such that there results a pattern of adhesive layers defining the first adhesive layer 2 which can be seen in FIG. 3. Of course, the adhesive is printed so as to provide the respective non-adhesive edge pieces 9*a*, 9*b* and the non-adhesive corner piece 11. At the same time a carrier web having a siliconized top surface is partially imprinted with varnish, which will constitute the layer of adhesive deadener 21 explained with regard to FIG. 2. A continuous web of clear polyester provided with an adhesive layer will be laminated onto the carrier web with its adhesive layer coming into contact with the siliconized surface of the carrier web and the printed varnish parts, respectively. The top side (i.e. the side not covered with adhesive) of the polyester layer is then printed with silicon, to form the bottom smooth layers 4*a* and 4*b*. Then the laminate is punched such that only the material portion 15*a* and 15*b* with the bottom smooth layer 4*a* and 4*b* shown in FIGS. 2 and 3 remain and adhere to the carrier length with the securing adhesive layer 7*a* and 7*b*.

The two material lengths prepared in this way are precisely laminated together. The laminated-together material lengths are repunched thereby producing the outlines of the labels as shown especially in FIG. 1. In this punching, the scored lines are also made which define the tags 3*a*, 3*b* and 20. They can be continuous scored lines, die cut lines, or perforation punches. Afterwards, the labels in the form shown in FIGS. 1 and 2 are available on a carrier length (not shown) for processing.

According to a second version of production, the base material for the labels may be an opaque material length (paper or plastic film) which is coated over its entire bottom side surface with an adhesive. The top side, which is opposite the bottom side, is printed in the desired manner using a conventional method, for example letter press printing or flexographic printing, so that the overlapping part and the base part, especially its tags, are provided with the desired imprints. A lacquer which cancels the adhesive action may then be printed over the continuous self-adhesive layer of the bottom side of the material length in the non-adhesive edge pieces 9*a* and 9*b* and the non-adhesive corner piece 11. This results in the production of the first adhesive layer 2 while the other parts printed with lacquer are made non-adhesive.

The other production steps are identical to the above described first version, and is omitted here to avoid repetition While various embodiments in accordance with the present invention have been shown and described, it is understood that the present invention is not limited thereto. These embodiments may be changed, modified and further applied by those skilled in the art. Thereafter, this invention is not limited to the details shown and described previously, but also includes all such changes and modifications which are encompassed by the appended claims.

I claim:

1. A label for labeling a container comprising:

a base part with a bottom side and a top side, said bottom side having a first adhesive layer provided thereon;

an overlapping part which adjoins said base part and at least partially covers said base part when said label is placed on the container;

at least one removable tag formed at said base part, an attachment means for detachably attaching said at least one removable tag;

at least one further removable tag formed in said overlapping part and being separated from said overlapping part by at least one of die cut lines, continuous scored lines, and perforated lines, a further attachment means for detachably attaching said at least one further removable tag;

said further attachment means comprising an adhesive-repelling layer which is attached to said bottom side of said overlapping part and adjoins said at least one further removable tag.

2. The label of claim 1, further comprising a fastening means for detachably fastening said overlapping part.

3. The label of claim 2, wherein said adhesive-repelling layer is positioned on a material portion.

4. The label of claim 3, wherein said material portion is dimensioned to overlap said at least one further removable tag on at least two sides and said adhesive-repelling layer has a surface area substantially corresponding to a surface are of said at least one further removable tag.

5. The label of claim 1, wherein said at least one further removable tag is imprinted on its top side.

6. The label of claim 3, wherein said material portion is imprinted with the same information as said at least one further removable tag.

7. The label of claim 3, wherein said material portion includes an adhesive layer which is covered by an adhesive deadener.

8. The label of claim 7, wherein said adhesive deadener comprises a varnish printed on said adhesive layer.

9. The label of claim 1, wherein said base part includes a widened area proximate to said at least one removable tag.

10. The label of claim 1, wherein said base part has a length which substantially corresponds to a periphery of the container to be labeled.

11. The label of claim 1, wherein said first adhesive layer extends into said overlapping part.

12. The label of claim 1, wherein said fastening means comprises a fastening adhesive layer provided on an edge area of said overlapping part away from said base part.

13. The label of claim 12, wherein said fastening adhesive layer includes a recess for forming a nonadhesive corner piece.

14. The label of claim 1, wherein said fastening means for detachably fastening said overlapping part comprises an adhesive-repelling top smooth layer which is located on a top side of said label.

15. The label of claim 1, wherein said overlapping part has a length which substantially corresponds to a periphery of the container to be labeled.

16. The label of claim 1, further comprising at least one information sheet positioned on a bottom side of said overlapping part.

17. A label for labeling a container comprising:

a base part with a bottom side and a top side, said bottom side having a first adhesive layer provided thereon;

an overlapping part which adjoins said base part and at least partially covers said base part when said label is placed on the container;

at least one removable tag formed at said base part, an attachment means or detachably attaching said at least one removable tag;

at least one further removable tag on a top side of said overlapping part including a tag adhesive layer;

said label further comprising an adhesive-repelling top smooth layer positioned on said top side of said overlapping part, said at least one further removable tag being removably adhered to said adhesive repelling smooth layer.

18. The label of claim 17, further comprising a fastening means for detachably fastening said overlapping part.

19. The label of claim 18, wherein said at least one further removable tag is positioned on a center portion of said overlapping part.

20. The label of claim 17, wherein said at least one further removable tag is imprinted.

21. The label of claim 20, wherein said top side of said overlapping part is imprinted with the same information as printed on said at least one further removable tag.

22. The label of claim 17, wherein said at least one further removable tag has a nonadhesive edge piece.

23. The label of claim 17, wherein said base part includes a widened area proximate to said at least one removable tag.

24. The label of claim 17, wherein said base part has a length which substantially corresponds to a periphery of the container to be labeled.

25. The label of claim 17, wherein a center area of said bottom side of said overlapping part is free of active adhesive.

26. The label of claim 17, wherein said fastening means comprises a fastening adhesive layer provided on an edge area of said overlapping part away from said base part.

27. The label of claim 26, wherein said fastening adhesive layer includes a recess for forming a nonadhesive corner piece.

28. The label of claim 18, wherein said fastening means for detachably fastening said overlapping part comprises an adhesive-repelling top smooth layer which is located on a top side of said label.

29. The label of claim 17, wherein said overlapping part has a length which substantially corresponds to a periphery of the container to be labeled.

30. The label of claim 17, further comprising at least one information sheet positioned on a bottom side of said overlapping part.

* * * * *